United States Patent
Riggins et al.

(10) Patent No.: US 7,833,459 B2
(45) Date of Patent: Nov. 16, 2010

(54) MOLDS AND METHODS FOR ROTATIONAL MOLDING

(75) Inventors: Jerry Christopher Riggins, Easley, SC (US); Richard L. Dobson, Liberty, SC (US); Howell Eugene Moore, Jr., Greenville, SC (US)

(73) Assignee: Confluence Holdings Corp., Easley, SC (US)

( * ) Notice: Subject to any disclaimer, the term of this patent is extended or adjusted under 35 U.S.C. 154(b) by 0 days.

(21) Appl. No.: 12/185,696

(22) Filed: Aug. 4, 2008

(65) Prior Publication Data

US 2010/0025889 A1 Feb. 4, 2010

(51) Int. Cl.
*B29C 41/06* (2006.01)

(52) U.S. Cl. .................. 264/310; 264/311; 425/425

(58) Field of Classification Search .......... 425/429, 425/435, 425, 466; 264/310, 311
See application file for complete search history.

(56) References Cited

U.S. PATENT DOCUMENTS

| | | | |
|---|---|---|---|
| 4,049,767 A | 9/1977 | Vaidya | |
| 4,146,565 A | 3/1979 | Quraishi | |
| 4,247,279 A | 1/1981 | Masters | |
| 4,980,112 A | 12/1990 | Masters | |
| 5,039,297 A | 8/1991 | Masters | |
| 5,094,607 A | 3/1992 | Masters | |
| 2007/0131156 A1* | 6/2007 | Aitken | 114/347 |

OTHER PUBLICATIONS

Beall, *Rotational Molding*, 1998, Hanser/Gardner Publications, Inc., Cincinnati, Ohio, USA.
Nugent, *Rotational Molding: A Practical Guide*, 2001, available from www.paulnugent.com, USA.
Finn Kayaks, "Excerpts from Finn Kayaks website" at http://www.finnayaks.com, accessed Nov. 19, 2009, Australia.
"Photos of Finn Kayaks Gizmo," photos taken during 2009 of the scupper tube on the Finn Kayaks Gizmo, which kayak applicants believe has been in production in Australia and on sale in Australia, both sine approximately 2006.

* cited by examiner

*Primary Examiner*—Joseph S Del Sole
*Assistant Examiner*—James Sanders
(74) *Attorney, Agent, or Firm*—Schwabe, Williamson & Wyatt, P.C.

(57) ABSTRACT

Molds and methods for rotational molding are disclosed. The molds for rotationally molding may include an interior surface, an exterior surface, an opening, and a post. The interior surface may define a molding cavity. The interior surface may include a first portion and a second portion disposed opposite the first portion. The opening may extend from the first portion of the interior surface to the exterior surface. The post may extend from the second portion of the interior surface, through the molding cavity, through the opening, and to a distal region.

28 Claims, 4 Drawing Sheets

MOLDS AND METHODS FOR ROTATIONAL MOLDING

FIELD OF THE DISCLOSURE

The present disclosure relates to molds and methods for rotational molding, and more particularly to molds and methods for rotational molding of recreational watercraft, such as kayaks or the like.

BACKGROUND OF THE DISCLOSURE

In rotational molding or rotomolding, the product or molded object is formed inside a closed mold or cavity while the mold is rotating bi-axially in a heating chamber. There are typically four steps, or stages, in a rotational molding process: loading, molding (or curing), cooling, and unloading. In the loading stage, either liquid or powdered plastic, which may be a thermoplastic, is charged into a hollow mold. The mold is closed, rotated about two orthogonal axes, and moved into a heating chamber or oven for the molding or curing stage. In the oven, heat penetrates the mold, causing the plastic to melt, adhere to, and sinter onto the mold surface. The mold continues to rotate during heating, and the plastic gradually becomes distributed evenly on the mold walls through gravitational force. As the cycle continues, the plastic melts completely, forming a homogeneous layer of molten thermoplastic on the interior surfaces of the mold. While continuing to rotate, the mold is moved out of the oven to a cooling area or chamber for the cooling stage, where the plastic is cooled to the point that the molded object will retain its shape. During cooling, the molded object typically shrinks away from the mold. In the unloading stage, rotation of the mold stops, and the mold is opened to remove the molded object.

Examples of molds and processes for rotational molding are disclosed in U.S. Pat. Nos. 4,049,767, 4,146,565, 4,247,279, 4,980,112, 5,039,297, and 5,094,607. Further examples and descriptions of molds and processes for rotational molding are provided in Glenn L. Beall, *Rotational Molding: Design, Materials, Tooling, and Processing* (Hanser/Gardner Publications, Inc. 1998) and in Paul Nugent, *Rotational Molding: A Practical Guide* (2001). The disclosures of these and all other publications referenced herein are incorporated by reference in their entirety for all purposes.

SUMMARY OF THE DISCLOSURE

In some examples, molds for rotationally molding kayaks may include a first mold section, a second mold section, and a post. The first mold section may include a first exterior surface, a first interior surface configured to mold a first portion of the kayak, and an opening. The opening may extend through the first mold section from the first interior surface to the first exterior surface. The second mold section may include a second exterior surface, and a second interior surface. The second interior surface may be configured to mold a second portion of the kayak. The mold may be configured to transition between an open configuration and a closed configuration. In the open configuration, the second mold section may be spaced from the first mold section. In the closed configuration, the first interior surface may be disposed opposite the second interior surface, and the first and second mold sections may collectively define at least a portion of a molding cavity. The post may extend from the second interior surface of the second mold section and may include a distal region spaced from the second interior surface. In the closed configuration the post may extend through the portion of the molding cavity defined by the mold sections and at least partially through the opening such that the distal region of the post may extend beyond the first interior surface.

In some examples, molds for rotationally molding kayaks may include an interior surface, an exterior surface, an opening, and a post. The interior surface may define a molding cavity. The interior surface may include a first portion and a second portion disposed opposite the first portion. The opening may extend from the first portion of the interior surface to the exterior surface. The post may extend from the second portion of the interior surface through the molding cavity and the opening. The post may include a distal region that extends beyond the exterior surface such that the distal region of the post may be disposed external to the mold. The distal region of the post may be configured to slide through the opening.

In some examples, methods of rotationally molding articles within a molding cavity may include providing a mold that includes first and second mold parts. The first mold part may have a first interior surface, a first exterior surface, and an opening extending through the first mold part from the first interior surface to the first exterior surface. The first interior surface may define a first portion of the molding cavity. The second mold part may have a second interior surface, which may define a second portion of the molding cavity. A post may extend from the second interior surface of the second mold part and into the molding cavity. The post may include a distal region spaced from the second interior surface and a proximal region disposed between the second interior surface and the distal region. Methods of rotationally molding articles within a molding cavity may further include loading plastic material into at least one of the first and second mold parts and moving the first and second mold parts into a closed position. In the closed position the post may extend through the opening and the distal region of the post may extend beyond the first exterior surface. Methods of rotationally molding articles within a molding cavity may further include heating the mold above a melt point of the plastic material, rotating the mold about two axes, adhering melted plastic material to the first and second interior surfaces and to at least a first portion of the proximal region of the post, cooling the mold, and removing the article from the mold.

DETAILED DESCRIPTION OF THE DISCLOSURE

Figure 1:
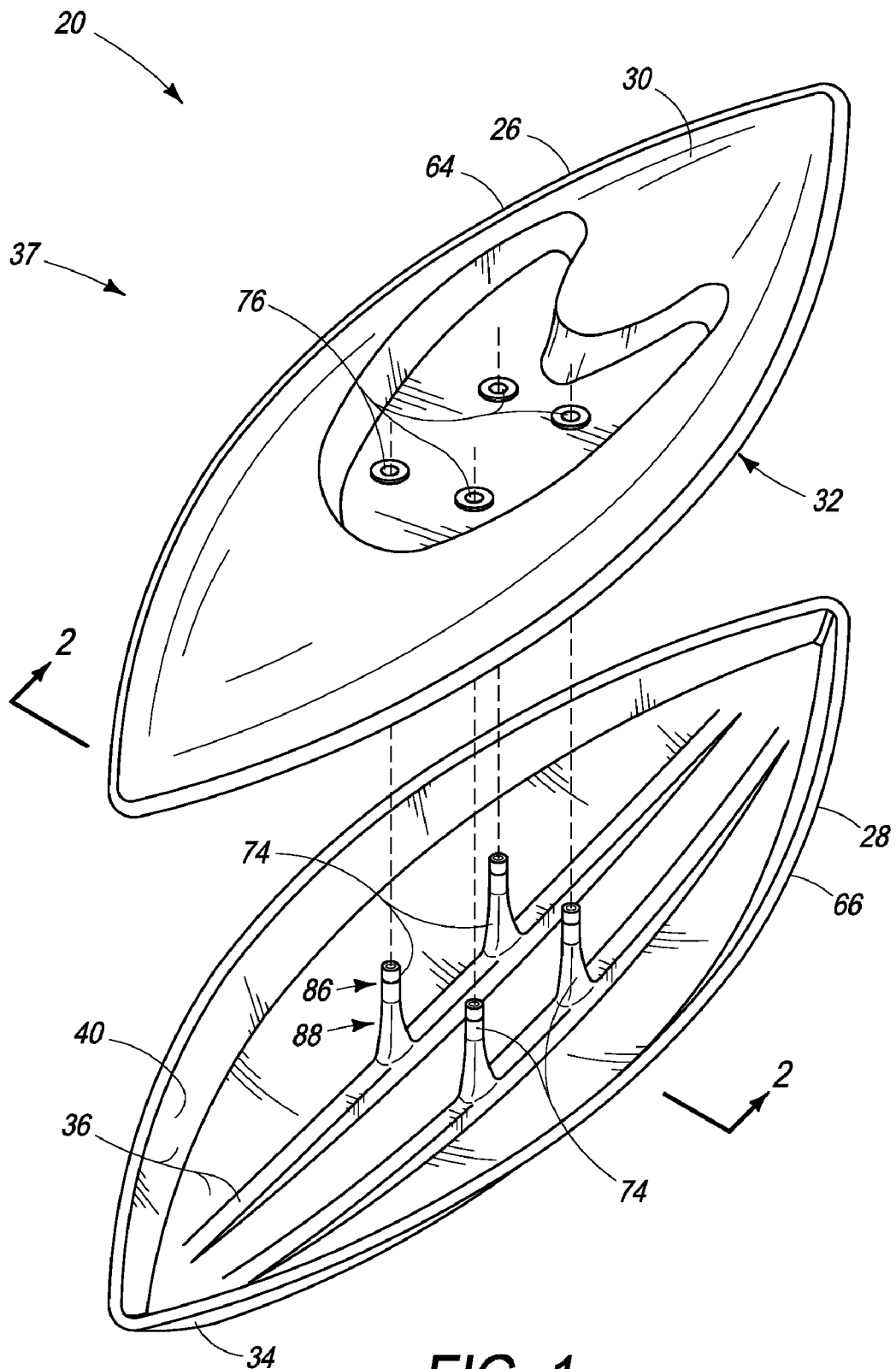
FIG. 1 is a perspective view of a nonexclusive illustrative example of a mold for rotationally molding an article such as the hull of a kayak, with the mold shown in an open configuration.
Figure 2:
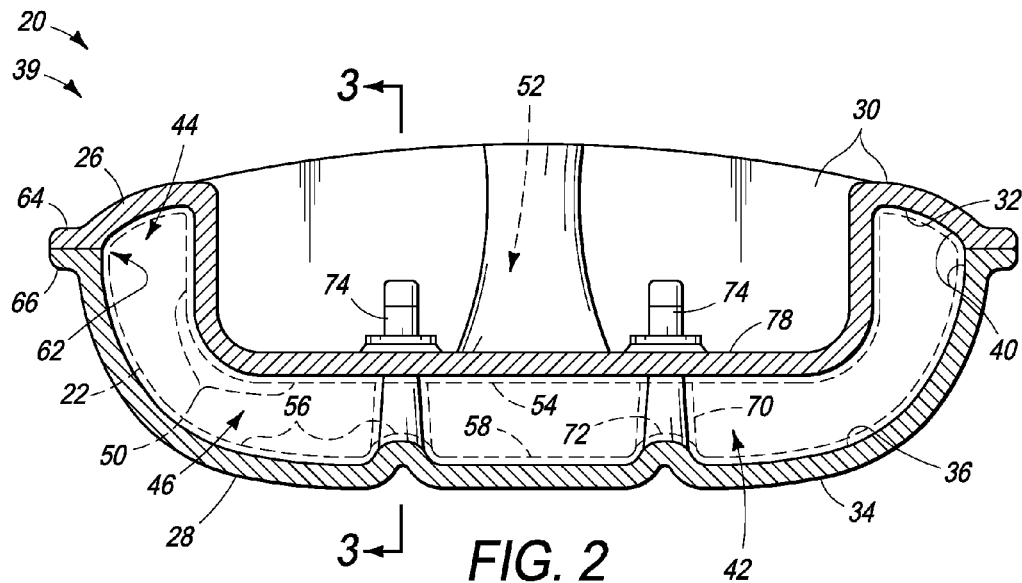
FIG. 2 is a cross-section view of the mold of FIG. 1, taken generally along line 2-2 in FIG. 1, with the mold shown in a closed configuration.

A nonexclusive illustrative example of a mold for rotationally molding an article is shown generally at 20 in FIGS. 1 and 2. Unless otherwise specified, the mold 20 and/or any parts or articles molded therein, may, but are not required to, contain at least one of the structures, components, functionalities, concepts, and/or variations described, illustrated, and/or incorporated herein. In the example shown in FIGS. 1 and 2, the mold 20 is configured to mold a kayak 22 (shown in dashed lines in FIG. 2). Although the illustrated mold 20 is configured for producing kayaks of a sealed hull or sit-on-top configuration, the mold 20 may additionally or alternatively be configured to mold other kayak configurations and/or other articles.

The mold 20 may include a plurality of mold parts or sections. In the example shown in FIG. 1, the mold 20 includes an upper or first mold section 26 and a lower or second mold section 28. The first mold section 26 includes a first exterior surface 30 and a first interior surface 32, while the second mold section 28 includes a second exterior surface 34 and a second interior surface 36.

As used herein, "upper" and "lower" are used to refer to particular parts or sections of the mold 20. The relative directions or orientations corresponding to "upper" and "lower" are based on the examples and drawings presented in this disclosure. However, the terms "upper" and "lower" should not be understood to require any particular orientation of the mold 20 or any of its various components in space, such as relative to the earth or any structures that support or otherwise engage the mold 20. In some examples, the first mold section 26 may be positioned above the second mold section 28, such as during at least a portion of the loading stage (as described more fully herein), such that liquid or powdered plastic may be charged into the second mold section 28. However, in other examples, the second mold section 28 may be positioned above the first mold section 26 during at least a portion of the loading stage, such that the liquid or powdered plastic may be charged into the first mold section 26.

The upper or first mold section 26 and the lower or second mold section 28 may be configured to mold particular portions, parts, sections and/or surfaces of the kayak 22. In the example shown in FIGS. 1 and 2, the first mold section 26 is configured to mold top or upper surfaces of the kayak 22, and the second mold section 28 is configured to mold bottom or lower surfaces of the kayak 22. However, in other examples, the first mold section 26 may be configured to mold bottom or lower surfaces of the kayak 22, while the second mold section 28 may be configured to mold top or upper surfaces of the kayak 22, and so forth.

The mold 20, and its various components, may be configured for positioning and/or orienting such that the mold 20 may be transitioned between an open configuration and a closed configuration. When the mold 20 is in the open configuration, shown generally at 37 in FIG. 1, the second mold section 28, or at least a portion thereof, is spaced from the first mold section 26, or at least a portion thereof.

When the mold 20 is in the closed configuration, shown generally at 39 in FIG. 2, the respective first and second interior surfaces 32, 36 of the first and second mold sections 26, 28 may collectively form at least a portion of an interior surface 40, which defines a molding cavity 42. In the example shown in FIG. 2, the first interior surface 32, as a first portion of the interior surface 40, defines a first portion 44 of the molding cavity 42, and the second interior surface 36, as a second portion of the interior surface 40, defines a second portion 46 of the molding cavity 42. In some examples, the first and second interior surfaces 32, 36 may collectively define less than the entirety of the interior surface 40 and, correspondingly, less than the entirety of the molding cavity 42. In some examples, the first and second interior surfaces 32, 36 may collectively define substantially the entire interior surface 40 and, correspondingly, substantially the entirety of the molding cavity 42.

When the mold 20 is in the closed configuration, as shown in the example in FIG. 2, the first interior surface 32 is configured to mold a first portion of the kayak 22, and the second interior surface 36 is configured to mold a second portion of the kayak. In some examples, at least a portion of the first interior surface 32 may be disposed generally opposite at least a portion of the second interior surface 36. In such an example, the first and second interior surfaces 32, 36 are configured to mold opposed portions of a kayak 22 molded within the cavity 42 of the mold 20. More particularly, in the example shown in FIGS. 1 and 2, the first interior surface 32 is configured to mold, amongst other structures or features, an upper panel or surface 50 of the kayak 22, which is shown to be shaped to form a cockpit 52, which is partially defined by a floor 54. Further, in this example, the second interior surface 36 is configured to mold, amongst other structures or features, a lower panel or surface 56 of the kayak 22, which is shown to include a lower hull surface 58.

The first and second mold sections 26, 28 may include corresponding structures configured to assist joining the mold sections together at an appropriate mold parting or part line 62. As shown in the example in FIGS. 1 and 2, the mold 20 may be reinforced at the part line 62 via first and second parting or mating flanges 64, 66 on the respective first and second mold sections 26, 28. The mold may be maintained or retained in the closed configuration 39 shown in FIG. 2 by way of suitable fasteners or clamping members configured to press mating flanges 64, 66 together, such as those disclosed in U.S. Pat. No. 4,980,112, the disclosure of which is herein incorporated by reference in its entirety for all purposes.

Figure 3:
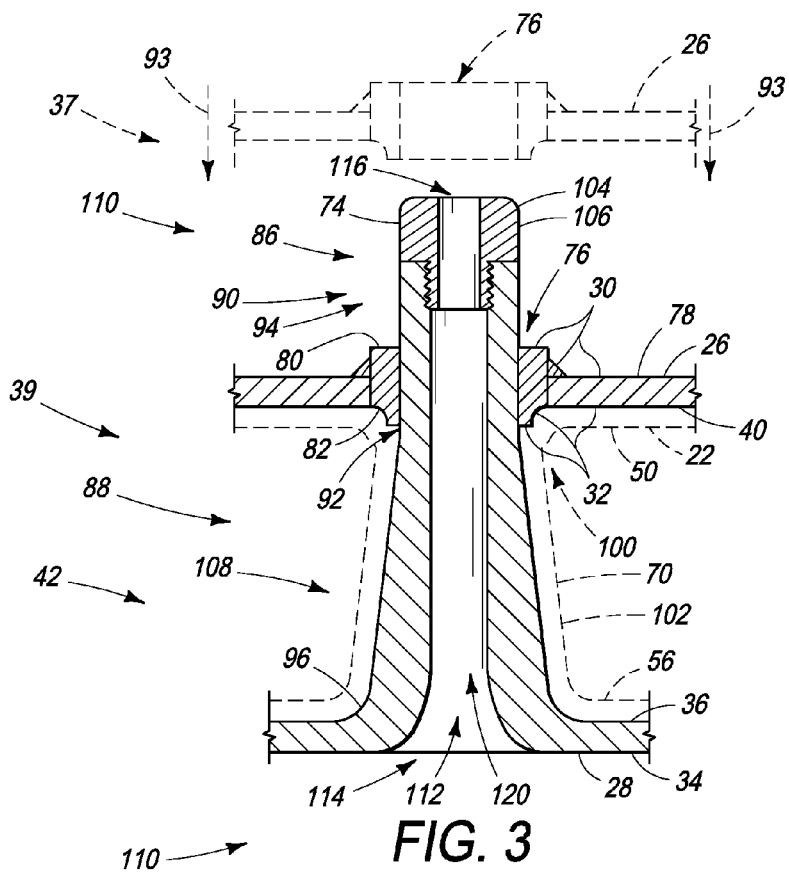
FIG. 3 is a cross-section view of one of the posts in the mold of FIG. 1, taken generally along line 3-3 in FIG. 2.

As shown in the example presented in FIGS. 1-3, the mold 20 is configured to mold one or more openings, passages or tubes 70, which extend between and integrally connect the upper surface 50 of the kayak 22 to the lower surface 56. Depending on the location of a particular tube 70, that tube may be configured to provide drainage and/or support between the upper and lower surfaces 50, 56 of the kayak 22. Various ones of the tubes 70 may also be configured to receive and/or support an accessory or other item that may be used with the kayak 22, such as a rudder, fin, skeg, fishing rod or mast. In the example shown in FIGS. 1-3, the tubes 70 are in the form of scupper holes or tubes that connect the floor 54 of the cockpit 52 to a lower hull surface 58 of the kayak 22, and more particularly to ribs 72 on the lower hull surface 58. In some examples, the tubes 70 may extend from a lower hull surface 58, such as one of the ribs 72, to a deck surface of the kayak 22 that is outside of the cockpit 52.

The number, configuration, and/or location of the tubes 70 may vary between examples. In the example shown in FIGS. 1-3, the mold 20 is configured to mold four scupper tubes that connect the floor 54 of the cockpit 52 to a lower hull surface 58 of the kayak 22. Other examples of the mold 20 may be configured to mold more or fewer tubes 70, such as one, two, three, five, six, seven, eight, nine, or even ten or more openings, passages or tubes 70.

The mold 20 may include one or more posts 74, and a number of corresponding apertures, holes, or openings, 76, which may collectively be configured to form the tubes 70. In the example shown in FIGS. 1-3, the posts 74 are disposed on, and extend generally upward from, the second mold section 28, and the corresponding openings 76 are disposed on the first mold section 26. In other examples, some or all of the posts 74 may be disposed on the first mold section 26, with the corresponding openings 76 being disposed on the other mold section.

One or more of the posts 74 may be attached to, or integral with, one of the first and second mold sections 26, 28. In the example shown in FIGS. 1-3, the posts 74 are disposed on, and extend generally upward from, the second interior surface 36 and are integral with the second mold section 28. In other examples, one or more of the posts 74 may be disposed on, and extend from, the first interior surface 32 and/or be integral with the first mold section 26.

Posts that are attached to, or integral with, one of the mold sections may be permanently and/or nonremovably attached to the mold section, such as by welding or bonding, or the post and the mold section may be cast as a single piece. However, in some examples, despite being attached to, or integral with, one of the mold sections for molding purposes, the posts may be removably mounted to, or detachable from the mold section. For example, at least one of the posts may be bolted or otherwise rigidly, but removably, attached to the mold section.

As shown in FIGS. 1 and 3, the openings 76 extend through a wall 78 of the first mold section 26, or more particularly from the first interior surface 32 to the first exterior surface 30. In some examples, the first mold section 26 may be reinforced proximate one or more of the openings 76. As shown in FIGS. 1-3, for example, the first mold section 26 includes a collar element 80 through which each opening 76 extends. In the example shown in FIGS. 1-3, the collar elements 80 are separate components that are welded to the first mold section 26, but in other examples, collar elements may be integral with the mold section. Still other examples may optionally include reinforcement in the form of a region of increased thickness proximate the openings 76.

In some examples, the collar elements 80 may be configured to provide a desirable contour, radius, shape, or profile to the portions of the kayak 22 molded by the collar elements 80. In the example shown in FIG. 3, the collar element 80 includes a fillet 82, which may provide for a rounded transition between the tube 70 and the upper panel or surface 50 of the kayak 22. The fillet 82 may be tangent to, or smoothly aligned with, the first interior surface 32 of the first mold section 26 as shown in FIG. 3. In some examples, at least some of the collar elements 80 may be inserted further into the mold than the collar element 80 shown in FIG. 3, such that the fillet is stepped relative to the first interior surface 32 of the first mold section 26.

In the example shown in FIGS. 1-3, the posts 74 are disposed on, and extend from, the second interior surface 36 of the second mold section 28 to a distal region 86 that is spaced from the second interior surface 36. In the example shown in FIG. 3, the tube 70 is formed on at least a portion of a proximal region 88 of the post 74, where the proximal region 88 of the post 74 is disposed proximate the second interior surface 36 and generally extends between the second interior surface 36 and the distal region 86 of the post 74. The proximal region 88 of the post 74 may have a relatively constant cross-section between the second interior surface 36 and the distal region 86 or, as shown in FIG. 3, generally tapers from the second interior surface 36 toward a non-tapered distal part 90 of the proximal region 88. In the example shown in FIG. 3, where the proximal region 88 of the post 74 is tapered, the mold 20 may be configured such that at least a portion 92 of the non-tapered, or cylindrical, distal part 90 of the proximal region 88 remains within the molding cavity 42 and between the first and second interior surfaces 32, 36.

The posts 74 may be configured to slide through the openings 76 when the first and second mold sections 26, 28 are brought together when transitioning the mold 20 from the open configuration 37 to the closed configuration 39, as indicated by the arrows 93 in FIG. 3. When the mold 20 is in the open configuration 37, as indicated by the second mold section 26 shown in dashed lines in FIG. 3, the posts 74 are spaced from the openings 76 and the first mold section 26. When the mold 20 is in the closed configuration 39, as indicated by the second mold section 26 shown in solid lines in FIG. 3, the posts 74 extend from the second interior surface 36, into and through the molding cavity 42, and at least partially through the openings 76 such that at least a portion of at least some of the posts 74, such as the distal region 86, extends beyond the first interior surface 32. As shown in FIG. 3, the distal region 86 and at least a portion 94 of the distal part 90 of the proximal region 88 extend beyond the first exterior surface 30 and thus are disposed external to the mold 20 when the mold is in the closed configuration.

The cross-sectional profile, or shape and size of the cross-section, of at least a portion of at least some of the posts 74 may correspond to the cross-sectional profile of the openings 76. In the example shown in FIGS. 1-3, the distal regions 86 and the distal parts 90 of the proximal regions 88 of the posts 74 have circular cross-sectional profiles that correspond to the circular openings 76. The cross-sectional profile of at least the distal regions 86 of the posts 74 may be relatively constant along the length of the posts 74. In the example shown in FIGS. 1-3, the distal region 86 and the distal part 90 of the proximal region 88 of at least some of the posts 74 are cylindrical with a circular cross-sectional profile. In some examples, at least a portion of the posts 74 and/or the openings 76 may have non-circular cross-sections, such as where the cross-sections are elongate, ovoid, elliptical, or polygonal, including cross-sections that have a relatively high aspect (length to width or width to length) ratio. In the example shown in FIGS. 1-3, the proximal regions 88 of the posts 74 taper, or otherwise change in cross-section, from elongate or ovoid bases 96 toward the circular cross-sectional profiles of the distal parts 90 of the proximal regions 88 of the posts 74.

The fit of the distal region 86 and/or the distal part 90 of the proximal region 88 of the posts 74 within, or relative to, the corresponding openings 76 may be configured to permit sliding of at least a portion of the post 74 through the opening 76 when the first and second mold sections 26, 28 are brought together, as indicated by arrows 93 in FIG. 3. For example, the distal region 86 and/or the distal part 90 of the proximal region 88 of the posts 74 may have a slip or loose fit within the openings 76. In some examples, the fit may be configured to reduce, minimize, or prevent leakage, seepage or flow of molten plastic through any gaps or annular passages that may exist between the posts 74 and the openings 76 during molding, which may reduce, minimize, or even prevent the formation of mold flash extending around that part of the distal region 86 and/or the distal part 90 of the proximal region 88 of the posts that extends beyond the first interior surface 32.

The mold flash, if any, that might form in any gaps between the posts 74 and the openings 76 during molding would extend from an open end 100 of the tube 70 proximate the upper panel or surface 50 and along the axis of the tube 70 rather than radially inward from the walls 102 of the tube 70. Further, such mold flash would be at least partially annular or tubular in shape. In contrast, forming tubes or passages through a rotationally molded part by way of mating opposed posts, such as in the manner of a tack off, results in flash that extends radially inward from the walls of the resulting tube. Trimming or removal of tubular or annular mold flash that extends from an open end 100 of the tube 70 may be less likely to reduce the thickness of the wall 102, and correspondingly less likely to reduce the structural integrity of the tube, than would removal of mold flash extending radially inward from the walls 102.

A sliding fit between the post 74 and the opening 76 may also assist with venting the mold 20. In particular, air or other gases that might be trapped in any gaps between the post 74 and the opening 76, may be vented away from the molded part and/or escape the mold through such gaps, which may reduce or prevent the formation of voids in, or blow holes through, the molded part. In contrast, when mating opposed posts are used to form tubes or passages through a rotationally molded part, air or other gases that might be trapped between the posts may lead to the formation of voids in, or blow holes through, the molded part when such trapped air or gases expand during the molding process.

The distal regions 86 of the posts 74 may be configured to reduce or prevent damage to the first mold section 26 when the first and second mold sections 26, 28 are brought together as the mold 20 is transitioned to the closed configuration 39. In particular, the distal regions 86 may be configured to reduce or prevent damage to the first interior surface 32, to the opening 76, and/or to the collar element 80. For example, at least a distal part 104 of the distal region 86 of at least some of the posts 74 may comprise a plastic or other material, such as Teflon, that may be softer than the material from which the first interior surface 32, the opening 76, and/or the collar element 80 are made. In the example shown in FIGS. 1-3, the distal part 104 of the distal region 86 of at least some of the posts 74 includes a plastic cap 106. As shown in FIG. 3, the plastic cap 106 may be threaded onto the distal region 86 of at least some of the posts 74. Inclusion of the plastic cap 106 on the posts 74 may reduce or prevent, for example, the impact damage or scratching that may otherwise result from bumping the posts 74 against the first interior surface 32, the openings 76 and/or the collar elements 80 when the mold sections are transitioned toward the closed configuration.

At least a portion of the second mold section 28 and at least the proximal region 88 of one or more posts 74 may be fabricated from a relatively heat conductive material, for example, to assist or enhance heat transfer or conduction to the interior of the mold 20, when the mold is heated. For example, the second mold section 28 and at least the proximal region 88 of the posts 74 may be fabricated from a metal, such as stainless steel or aluminum, or from a relatively heat conductive material such as a metal filled thermosetting plastic material. Thus, the portions 94 of the distal parts 90 of the proximal regions 88 of at least some of the posts 74 that extend beyond the first exterior surface 30 provide a heat conductive portion of those posts 74 that is disposed external to the mold 20 when the mold 20 is in the closed configuration 39. Such a configuration may assist with heat transfer or conduction into a region 108 of those posts 74 that is within the molding cavity 42 and spaced from the first and second interior surfaces 32, 36. In particular, as shown in FIG. 3, heat may be conducted from the environment or region 110 that is external to the mold 20 to the region 108 from both ends of each post 74, via the portions 94 and the bases 96.

In some examples, at least some of the posts 74 may include a hole, channel or passage extending through the post. As shown in the example presented in FIG. 3, a passage 112 extends from an opening 114 on the second exterior surface 34, through the post 74, and to an opening 116, which is disposed on the distal region 86 of the post 74 and thus external to the mold 20 when the mold 20 is in the closed configuration 39. In this configuration, the openings 114, 116 and passage 112 are fluidly connected to the external region 110 such that a fluid pathway 120 exists through the passage 112. The fluid pathway 120 may allow heated air or other gases external to the mold 20 to pass, flow, or be forced through the passage 112 and thereby assist heat transfer to the region 108 of the post 74.

As indicated above, a rotationally molded kayak 22 produced in the mold 20 may include an upper panel or surface 50 that is molded by the first interior surface 32 of the mold 20, a lower panel or surface 56 that is molded by the second interior surface 36 of the mold 20 and is opposed to the upper panel or surface 50, and one or more scupper holes or tubes 70 that extend between and integrally connect the upper panel or surface 50 to the lower panel or surface 56.

Figure 4:
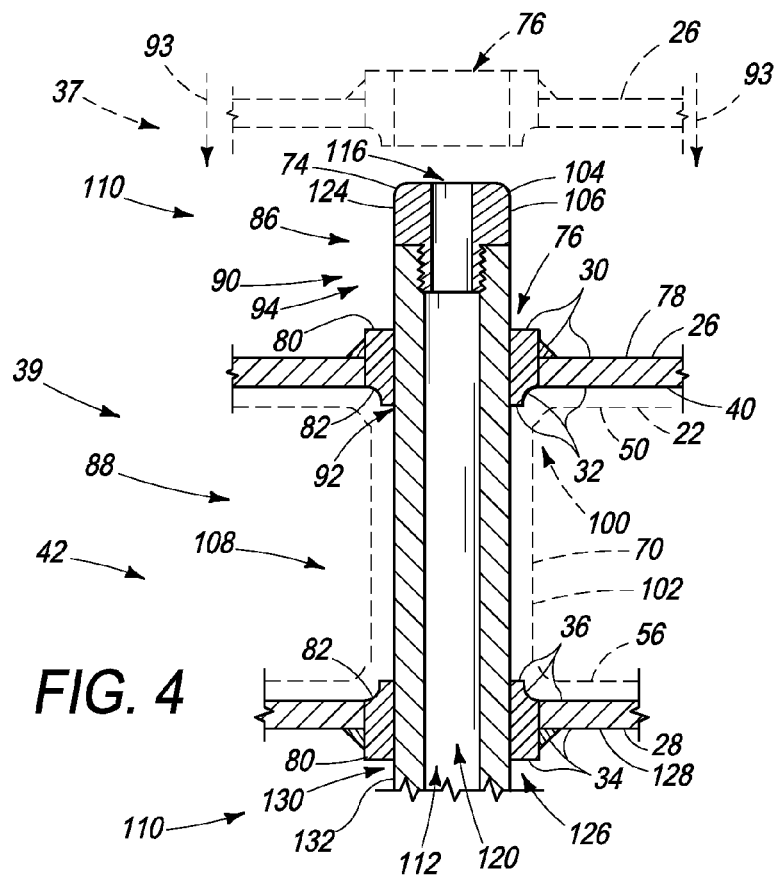
FIG. 4 is a cross-section view of a nonexclusive illustrative example of a post that extends through both sections of the mold and is suitable for use with the mold of FIG. 1.
Figure 5:
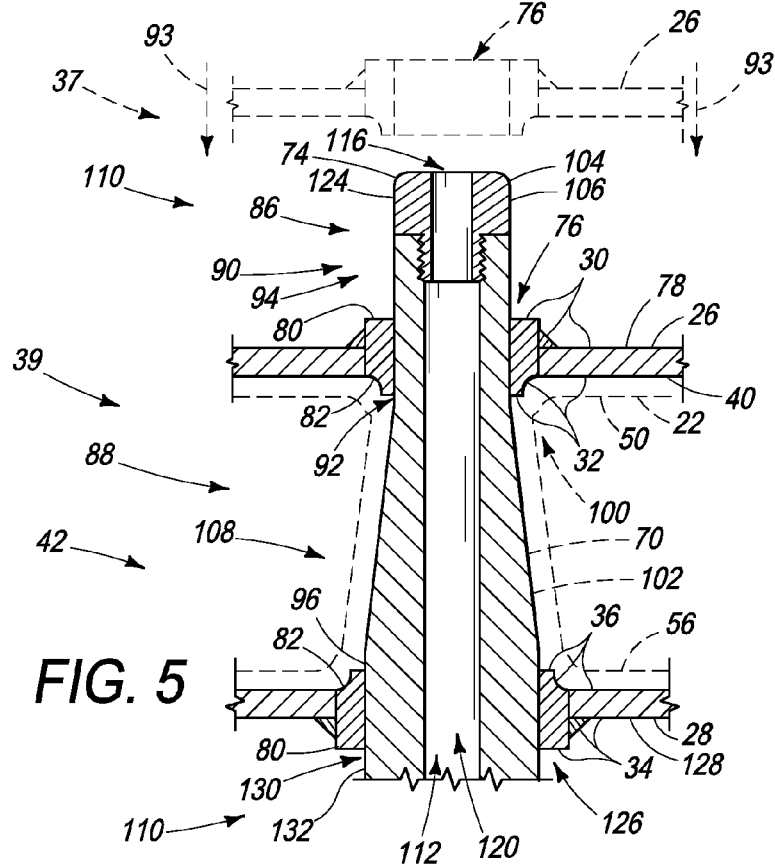
FIG. 5 is a cross-section view of another nonexclusive illustrative example of a post that extends through both sections of the mold and is suitable for use with the mold of FIG. 1.

In some examples, rather than being integral with the second mold section 28 of the mold 20, the posts 74 may be discrete or separate from both the first and second mold sections 26, 28. Nonexclusive illustrative examples of posts 74 that are separate from both the first and second mold sections 26, 28 are shown generally at 124 in FIGS. 4 and 5. Unless otherwise specified, each of the posts 124 and portions of the mold 20 shown in FIGS. 4 and 5, may, but are not required to, contain at least one of the structures, components, functionalities, concepts, and/or variations described, illustrated, and/or incorporated herein. In the examples shown in FIGS. 4 and 5, the mold 20 includes a second opening 126 that extends through a wall 128 of the second mold section 28, from the second interior surface 36 to the second exterior surface 34. The second opening 126 is disposed opposite the first opening 76 that extends through the wall 78 of the first mold section 26. As shown in FIGS. 4 and 5, the second mold section 28 may be reinforced proximate the second opening 126, such as by inclusion of a collar element 80 through which the second opening 126 extends, as discussed above.

When the mold 20 is in the closed configuration 39, as shown in the examples of FIGS. 4 and 5, the posts 124 may extend through the second interior surface 36 of the second mold section 28, through the portion of the molding cavity 42 defined by the first and second mold sections 26, 28, and through the first interior surface 32 of the first mold section 26. In some examples, when the mold 20 is in the closed configuration 39, the posts 124 may extend through the first opening 76, through the molding cavity 42, and through the second opening 126 such that the posts 124 may extend beyond the first and second exterior surfaces 30, 34. For example, as shown the example of FIGS. 4 and 5, at least a portion 94 of the distal part 90 of the proximal region 88 may extend beyond the first exterior surface 30 while a base extension 130 of the post 124 extends beyond the second interior surface 36, with a proximal portion 132 of the base extension 130 extending beyond the second exterior surface 34.

As shown in the examples of FIGS. 4 and 5, the passage 112 may extend through the posts 124, from the opening 116 towards the proximal portion 132 of the base extension 130. In some examples, the passage 112 may extend from the opening 116 to a second opening (not shown in FIGS. 4 and 5) on the proximal portion 132. Such a second opening, which would be disposed external to the mold 20 when the mold 20 is in the closed configuration 39, would be fluidly connected to the external region 110. In such an example, the passage 112 would thus extend between openings that are fluidly connected to the external region 110 such that the passage 112 would provide a fluid pathway 120 through the posts 124 when the mold 20 is in the closed configuration 39.

In some examples, at least one of the posts 124 may be supported relative to the mold 20. For example, the base extension 130 may extend toward, and be supported by, a support structure (not shown in FIGS. 4 and 5), such as a support structure that supports one or both of the first and second mold sections 26, 28 during at least a portion of the rotational molding process. Nonexclusive illustrative examples of support structures are disclosed in U.S. Pat. Nos. 4,980,112, 5,039,297, and 5,094,607. In some examples, such support structures may be fixed relative to one or both of the first and second mold sections 26, 28. In some examples, such support structures may be configured to move relative to one or both of the first and second mold sections 26, 28.

At least a portion of the posts 124 may be configured to slide through, or relative to, at least one of the first and second openings 76, 126, such as where the cross-sectional profile of at least a portion of the post 124 corresponds to the cross-sectional profile of the openings 76, 126. As suggested in the examples of FIGS. 4 and 5, the posts 124 may be configured to slide through the first openings 76 when the first and second mold sections 26, 28 are brought together when transitioning the mold 20 from the open configuration 37 to the closed configuration 39, as indicated by the arrows 93. The posts 124 may additionally or alternatively be configured to slide through the second openings 126, such as where the cross-sectional profile of at least a portion of the base extension 130 corresponds to the cross-sectional profile of the openings 126.

Some examples of post 124 may have a relatively constant cross-section along their length, while other examples of post 124 may have a cross-sectional profile that varies along at least a portion of the length of the post 124. In the example shown in FIG. 4, the post 124 is substantially cylindrical, having a circular cross-sectional profile that is a constant size along at least a portion of the length of the post. In other examples, the post 124 could have a substantially cylindrical, but non-circular, cross-sectional profile such as a constant-sized elongate, ovoid, elliptical, or polygonal cross-sectional profile. In examples where the post 124 is substantially cylindrical, the cross-sectional profile of the post may correspond to the cross-sectional profile of the first and second openings 76, 126.

In the example shown in FIG. 5, at least a portion of the post 124 between the first and second interior surfaces 32, 36 of the mold 20 is tapered. In particular, the post 124 shown in FIG. 5 tapers from a second cross-sectional profile, which corresponds to the cross-sectional profile of the second opening 126, to a first cross-sectional profile, which corresponds to the cross-sectional profile of the first opening 76. The first and second cross-sectional profiles may have the same shape, such as where both openings are circular, or they may have different shapes, such as where one opening is circular and the other opening is elongate, ovoid, elliptical, or polygonal.

In some examples, the mold 20 may include at least two posts 124 that are parallel to each other, as is the case for the posts 74 shown in the example presented in FIGS. 1 and 2. However, in other examples, the mold 20 may include at least two posts 124 that are not parallel to each other. In such examples, the posts 124 may be oriented along lines that intersect or are skew.

Figure 6:
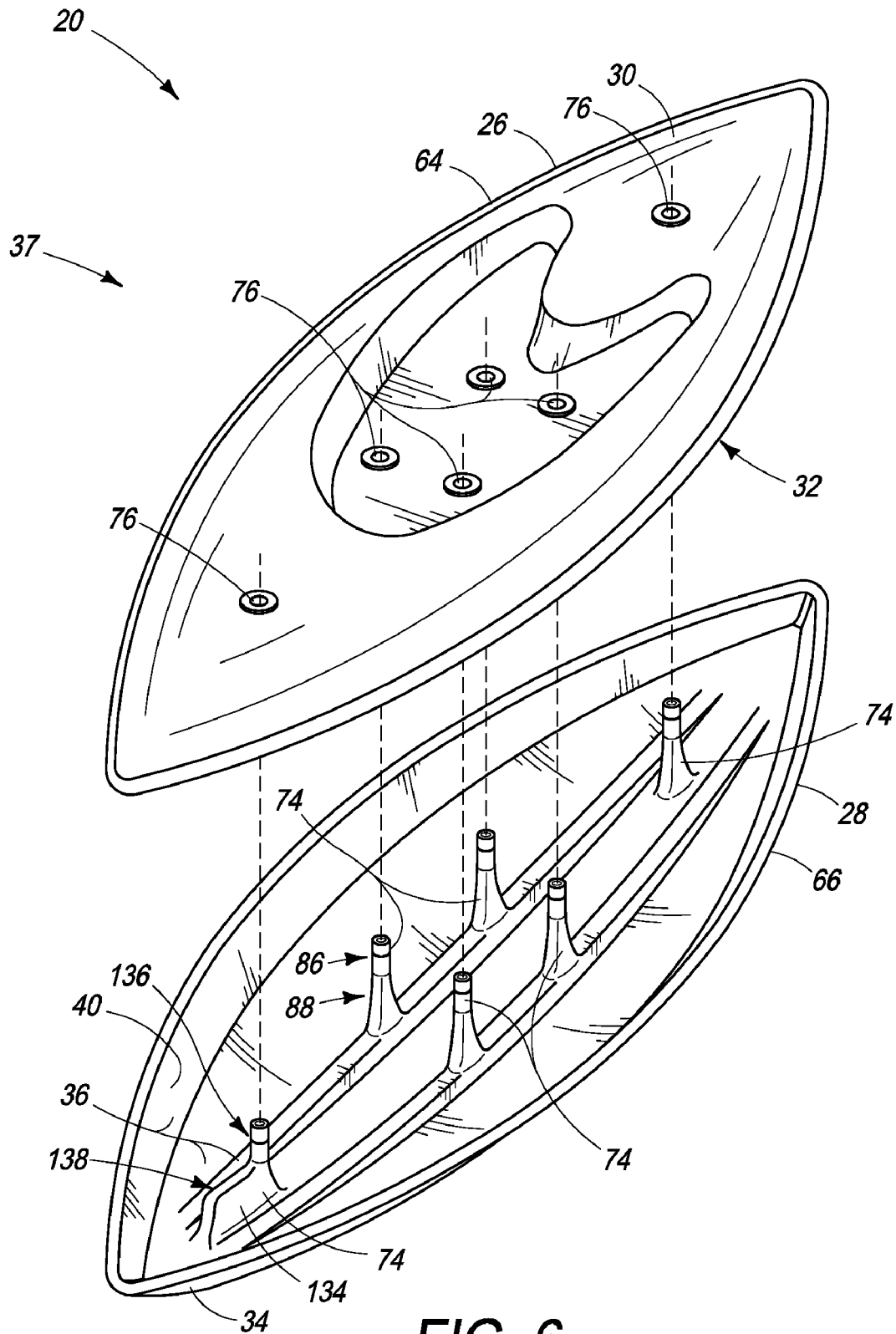
FIG. 6 is a perspective view of another nonexclusive illustrative example of a mold for rotationally molding an article such as the hull of a kayak, with the mold shown in an open configuration.

Another nonexclusive illustrative example of a mold for rotationally molding an article is shown generally at 20 in FIG. 6. Unless otherwise specified, the mold 20 and/or any parts or articles molded therein, may, but are not required to, contain at least one of the structures, components, functionalities, concepts, and/or variations described, illustrated, and/or incorporated herein. In the example shown in FIG. 6, the mold 20 is configured to mold a kayak 22 (such as the one shown in dashed lines in FIG. 2 and discussed above). The mold 20 shown in FIG. 6 includes a plurality of posts 74 configured to mold various openings, passages, pockets or tubes that extend through the kayak, some of which extend from a lower hull surface to a deck surface of the kayak that is outside of the cockpit.

In the example shown in FIG. 6, one of the posts 74 is configured as a skeg pocket post 134, which includes a proximal region 136 and a distal region 138. The proximal region 136 of the skeg pocket post 134 shown in FIG. 6 is configured to mold a recess or pocket on and/or in the lower surface of a kayak. Such a recess or pocket may be configured to receive a rudder, fin or skeg, which may be retractable. The distal region 138 is configured to extend through a corresponding opening 76 in the first mold section 26, such that the recess or pocket includes a passage that extends through the upper surface of the kayak.

The following paragraphs describe a nonexclusive illustrative method for rotationally molding an article, using the concepts and components discussed above. Although the steps of the following method may be performed in the order in which they are presented below, it is within the scope of this disclosure for the following steps, either alone or in various combinations, to be performed before and/or after any of the other following steps. A method for rotationally molding an article, such as a kayak 22, within a molding cavity 42 may include providing a mold 20 having a first mold part or section 26, a second mold part or section 28, and a post 74. As described above, the first mold section 26 may have a first interior surface 32, a first exterior surface 30, and an opening 76 extending through the first mold section 26 from the first interior surface 32 to the first exterior surface 30, with the first interior surface 32 defining a first portion 44 of the molding cavity 42. The second mold section 28 may have a second interior surface 36 that defines a second portion 46 of the molding cavity 42. The post 74 may extend from the second interior surface 36 of the second mold section 28 and into the molding cavity 42, and may include a distal region 86 spaced from the second interior surface 36 and a proximal region 88 disposed between the second interior surface 36 and the distal region 86. In some examples, the second mold section 28 and the proximal region 88 of the post 74 may be formed from, or include, metal, and the distal region 86 of the post 74 may be formed from, or include, plastic. In some examples, at least a portion of the proximal region 88, such as the portion 94, of the post 74 may extend beyond the first exterior surface 30 when the first and second mold sections 26, 28 are in the closed position or configuration 39.

The nonexclusive illustrative method further includes loading plastic material into one or both of the mold sections 26, 28, and moving the mold sections into a closed configuration 39. In the closed configuration 39, the posts 74 may extend through the openings 76 and the distal region 86 of the posts 74 may extend beyond the first exterior surface 30. In some examples, the posts 74 may slide, pass or move through the openings 76 when the mold sections are moved into the closed configuration 39. In some examples, such as where the mold includes at least one post 124 and opposed first and second openings 76, 126 through the first and second mold sections 26, 28, at least one of the posts may be slid or passed through, or relative to, at least one of the first and second openings 76, 126 after the mold sections have been moved into the closed configuration 39. In some examples, a post 124 may be slid or passed through one of the first and second openings 76, 126 prior to the mold sections being moved into the closed configuration 39 and through the other of the first and second openings 76, 126 after the mold sections have been moved into the closed configuration 39, or while they are being moved into the closed configuration 39.

The nonexclusive illustrative method further includes heating the mold 20 to, or above, a melt point of the plastic material, rotating the mold 20 about two or more axes, and adhering melted plastic material to the first and second interior surfaces 32, 36 and to at least a portion of the proximal region 88 of the post 74. In some examples of the method, the plastic material adhering to at least the first portion of the proximal region 88 of the post 74 may form a tube 70, the plastic material adhering to the first and second interior surfaces 32, 36 may form opposed panels 50, 56, and the tube 70 may extend between, and integrally connect, the opposed panels 50, 56. The nonexclusive illustrative method further includes cooling the mold 20, or allowing it to cool, and removing the molded article from the mold 20. In examples where the mold 20 includes at least one post 124 and opposed first and second openings 76, 126 in the first and second mold sections 26, 28, at least one of the posts 124 may be removed from the mold prior to separating the molds sections and/or removing the molded article from the mold.

In examples of the method where the molded article is a kayak 22, the plastic material adhering to at least the first portion of the proximal region 88 of the post 74 may produce a tube 70 that forms a scupper hole, which extends from an upper surface 50 of the kayak 22 to a lower surface 56. In some examples, the upper surface 50 of the kayak 22 may be a cockpit floor 54 and the lower surface 56 of the kayak may be a lower hull surface 58.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A mold for rotationally molding a kayak, the mold being configured to transition between an open configuration and a closed configuration, the mold comprising:
   a first mold section, including:
   a first exterior surface,
   a first interior surface configured to mold a first portion of the kayak, and an opening through the first mold section from the first interior surface to the first exterior surface;
   a second mold section, including:
   a second exterior surface,
   a second interior surface configured to mold a second portion of the kayak, where in the open configuration the second mold section is spaced from the first mold section, and in the closed configuration the first interior surface is disposed opposite the second interior surface such that the first and second mold sections collectively define at least a portion of a molding cavity, and
   a post extending from the second interior surface of the second mold section, wherein the post includes a distal region spaced from the second interior surface, and in the closed configuration the post extends through the portion of the molding cavity defined by the mold sections and at least partially through the opening such that the distal region of the post extends beyond the first interior surface, wherein the post creates a hollow tube in the kayak, and wherein any mold flash created during molding of the kayak extends from an outside surface of the kayak and does not extend radially inward from a wall of the hollow tube.

2. The mold of claim 1, where in the closed configuration the post extends through the molding cavity and through the opening such that the distal region of the post extends beyond the first exterior surface.

3. The mold of claim 2, wherein the post includes a proximal region disposed between the second interior surface and the distal region, and the proximal region of the post includes a distal part that extends beyond the first exterior surface when the first and second mold parts are in the closed position.

4. The mold of claim 3, wherein the second mold section and the proximal region of the post comprise a metal, and the distal region of the post comprises a plastic.

5. The mold of claim 3, wherein the proximal region of the post is tapered between the second interior surface and the distal part of the proximal region.

6. The mold of claim 2, wherein the distal region of the post slides through the opening when the mold is transitioned from the open configuration to the closed configuration.

7. The mold of claim 6, where in the open configuration the post is spaced from the first mold section.

8. The mold of claim 1, wherein the opening through the first mold section is a first opening; wherein the second mold section includes a second opening on the second exterior surface, a third opening on the distal region of the post, and a passage extending therebetween; and where in the closed configuration the second and third openings are fluidly connected to a region external to the mold.

9. The mold of claim 1, wherein the post is integral with the second mold section.

10. The mold of claim 1, wherein:
   the opening through the first mold section is a first opening;
   the second mold section includes a second opening through the second mold section from the second interior surface to the second exterior surface; and
   in the closed configuration, the post extends through the second interior surface of the second mold section, through the portion of the molding cavity defined by the mold sections, and through the first interior surface.

11. The mold of claim 10, where in the closed configuration the post extends through the first opening, through the molding cavity, and through the second opening such that the post extends beyond the first and second exterior surfaces.

12. The mold of claim 11, wherein the post is configured to slide relative to at least one of the first and second openings.

13. The mold of claim 12, wherein the post is configured to slide relative to the first and second openings.

14. The mold of claim 1, wherein the post is separate from the second mold section.

15. The mold of claim 1, wherein the first interior surface is configured to mold an upper surface of the kayak, the second interior surface is configured to mold a lower surface of the kayak, and at least a portion of the post is configured to mold a scupper tube that extends between the upper surface of the kayak and the lower surface of the kayak.

16. A mold for rotationally molding a kayak, comprising:
   an interior surface defining a molding cavity, the interior surface including a first portion and a second portion disposed opposite the first portion;
   an exterior surface;
   an opening extending from the first portion of the interior surface to the exterior surface; and
   a post extending from the second portion of the interior surface through the molding cavity and the opening, the post including a distal region that extends beyond the exterior surface such that the distal region of the post is disposed external to the mold, wherein the distal region of the post is configured to slide through the opening, wherein the post creates a hollow tube in the kayak, and wherein any mold flash created during molding of the kayak extends from an outside surface of the kayak and does not extend radially inward from a wall of the hollow tube.

17. The mold of claim 16, further comprising a passage extending from the exterior surface, through the post, and to a second opening disposed on the distal region of the post external to the mold.

18. The mold of claim 16, wherein the post comprises a proximal region disposed proximate the second portion of the interior surface, the first portion is configured to mold a cockpit of the kayak, the second portion is configured to mold a lower hull surface of the kayak, and the proximal region is configured to mold a scupper hole extending through the kayak from the cockpit to the lower hull surface.

19. The mold of claim 16, wherein the mold is configured to transition between a closed configuration in which the distal region extends beyond the exterior surface and is disposed external to the mold, and an open configuration in which the post is spaced from the opening, and wherein the distal region of the post slides through the opening when the mold is transitioned between the closed configuration and the open configuration.

20. The mold of claim 16, wherein the post is disposed on and integral with the second portion of the interior surface.

21. A method of rotationally molding a kayak within a molding cavity, comprising:
   providing a mold that includes:
      a first mold part having a first interior surface, a first exterior surface, and an opening extending through the first mold part from the first interior surface to the first exterior surface, wherein the first interior surface defines a first portion of the molding cavity,
      a second mold part having a second interior surface that defines a second portion of the molding cavity, and
      a post extending from the second interior surface of the second mold part and into the molding cavity, wherein the post includes a distal region spaced from the second interior surface and a proximal region disposed between the second interior surface and the distal region;
   loading plastic material into at least one of the first and second mold parts;
   moving the first and second mold parts into a closed position, where in the closed position the post extends through the opening and the distal region of the post extends beyond the first exterior surface; wherein the post creates a hollow tube in the kayak, and wherein any mold flash created during molding of the kayak extends from an outside surface of the kayak and does not extend radially inward from a wall of the hollow tube
   heating the mold above a melt point of the plastic material;
   rotating the mold about two axes;
   adhering melted plastic material to the first and second interior surfaces and to at least a first portion of the proximal region of the post;
   cooling the mold; and
   removing the kayak from the mold.

22. The method of claim 21, wherein the second mold part and the proximal region of the post comprise a metal and the distal region of the post comprises a plastic.

23. The method of claim 22, wherein at least a second portion of the proximal region of the post extends beyond the first exterior surface when the first and second mold parts are in the closed position.

24. The method of claim 21, wherein the opening extending through the first mold part from the first interior surface to the first exterior surface is a first opening, the second mold part has a second exterior surface and includes a passage extending from a second opening on the second exterior surface to a third opening on the distal region of the post, and in the closed position the second and third openings are exposed to a region external to the mold.

25. The method of claim 21, wherein the plastic material adhering to at least the first portion of the proximal region of the post forms a tube, the plastic material adhering to the first and second interior surfaces forms opposed panels, and the tube extends between and integrally connects the opposed panels.

26. The method of claim 21, wherein the plastic material adhering to at least the first portion of the proximal region of the post produces a scupper hole that extends from an upper surface of the kayak to a lower surface of the kayak.

27. The method of claim 26, wherein the upper surface of the kayak is a cockpit floor of the kayak and the lower surface of the kayak is a lower hull surface.

28. The method of claim 21, wherein the distal region of the post moves through the opening when the first and second mold parts are moved into the closed position.

* * * * *